US012810576B2

(12) United States Patent
Kudo et al.

(10) Patent No.: US 12,810,576 B2
(45) Date of Patent: Nov. 24, 2026

(54) DETECTION SYSTEM, DETECTION APPARATUS, LEARNING APPARATUS, DETECTION METHOD, LEARNING METHOD AND PROGRAM

(71) Applicants: Shunsuke Kudo, Kanagawa (JP); Waka Lin, Tokyo (JP); Shusaku Shiomoto, Kanagawa (JP)

(72) Inventors: Shunsuke Kudo, Kanagawa (JP); Waka Lin, Tokyo (JP); Shusaku Shiomoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 274 days.

(21) Appl. No.: 18/520,668

(22) Filed: Nov. 28, 2023

(65) Prior Publication Data

US 2024/0177446 A1 May 30, 2024

(30) Foreign Application Priority Data

Nov. 30, 2022 (JP) ................................ 2022-191465

(51) Int. Cl.
*G06V 10/30* (2022.01)
*G06T 11/10* (2026.01)
(Continued)

(52) U.S. Cl.
CPC .............. *G06V 10/30* (2022.01); *G06T 11/10* (2026.01); *G06V 10/255* (2022.01); *G06V 10/774* (2022.01); *G06V 2201/07* (2022.01)

(58) Field of Classification Search
CPC ... G06V 10/30; G06V 10/774; G06V 2201/03
See application file for complete search history.

(56) References Cited

U.S. PATENT DOCUMENTS

2017/0169567 A1 6/2017 Chefd'hotel et al.
2020/0300835 A1 9/2020 Lin et al.
(Continued)

FOREIGN PATENT DOCUMENTS

JP 20122501646 A 1/2012
JP 6629762 B2 1/2020
(Continued)

OTHER PUBLICATIONS

U.S. Appl. No. 18/332,209, filed Jun. 9, 2023.
(Continued)

*Primary Examiner* — Chan S Park
(74) *Attorney, Agent, or Firm* — XSENSUS LLP

(57) ABSTRACT

A detection system includes a learning apparatus and a detection apparatus. The learning apparatus has a first pre-processing unit that extracts, from a captured image used for training, which includes a noise image and an image of an object having a detection target, a training image, based on a structure around the detection target, and a training unit that trains a machine learning model based on the training image. The detection apparatus has an acquisition unit that acquires the machine learning model, a second preprocessing unit that extracts, from a captured image used for detection, which includes the noise image and the image of the object, candidates for being the detection target image, based on the structure around the detection target, and a detection unit that detects a detection target image from among the detection target image candidates, by using the machine learning model.

4 Claims, 8 Drawing Sheets

(51) Int. Cl.

| | |
|---|---|
| ***G06V 10/20*** | (2022.01) |
| ***G06V 10/774*** | (2022.01) |

(56) References Cited

U.S. PATENT DOCUMENTS

| | | | | |
|---|---|---|---|---|
| 2020/0349498 | A1* | 11/2020 | Brooks | G06N 3/0464 |
| 2021/0248419 | A1 | 8/2021 | Cumming et al. | |
| 2023/0136115 | A1 | 5/2023 | Shiomoto et al. | |
| 2023/0251384 | A1* | 8/2023 | Gangundi | G01S 7/497<br>356/4.01 |
| 2024/0122566 | A1* | 4/2024 | Cziria | G06T 7/33 |

FOREIGN PATENT DOCUMENTS

| | | |
|---|---|---|
| JP | 2021-517255 A | 7/2021 |
| JP | 2022-026115 A | 2/2022 |

OTHER PUBLICATIONS

Extended European Search Report issued Apr. 8, 2024 in European Patent Application No. 23212308.3, 7 pages.

Eddie M. Gil, et al., "Segmenting quantitative phase images of neurons using a deep learning model trained on images generated from a neuronal growth model", Proc. of SPIE, vol. 11970, Mar. 2, 2022, 8 pages, XP060154810.

Dwarikanath Mahapatra, "Learning of Inter-Label Geometric Relationships Using Self-Supervised Learning: Application To Gleason Grade Segmentation", arxiv.org, Oct. 1, 2021, 15 pages, XP091071838.

Office Action issued May 19, 2026 in Japanese Patent Application No. 2022-191465.

Zahra Riahi Samani et al., "Distinct tumor signatures using deep learning-based characterization of the peritumoral microenvironment in glioblastomas and brain metastases", Scientific Reports, German, Springer Nature, Jul. 14, 2021, vol. 11, No. 14469, pp. 1-9, <https://www.nature.com/articles/s41598-021-93804-6>.

Feigege Wang et al., "Context-Aware Spatio-Recurrent Curvilinear Structure Segmentation", 2019 IEEE/CVF Conference on Computer Vision and Pattern Recognition (CVPR), United States, IEEE, Jun. 15, 2019, pp. 12640-12649.

Office Action issued Aug. 4, 2026 in Japanese Patent Application No. 2022-191465.

Michael S. Smirnov et al., "An open-source tool for analysis and automatic identification of dendritic spines using machine learning", PLOS One [online], U.S., Plos, Jul. 5, 2018, pp. 1-16, [retrieved on 2026.07.14] retrieved from <https://journals.plos.org/plosone/article?id=10.1371/journal.pone.0199589>.

Decision for Dismissal of Amendment issued Oct. 20, 2026 in corresponding Japanese Application No. 2022-191465.

* cited by examiner

| TRAINING DATA | CORRECT LABEL |
|---|---|
| FIRST TRAINING IMAGE | FIRST DETECTION TARGET CLASS |
| SECOND TRAINING IMAGE | SECOND DETECTION TARGET CLASS |
| • • • | • • • |
| n-TH TRAINING IMAGE | NOISE CLASS |

DETECTION SYSTEM, DETECTION APPARATUS, LEARNING APPARATUS, DETECTION METHOD, LEARNING METHOD AND PROGRAM

CROSS-REFERENCE TO RELATED APPLICATION

Priority is claimed on Japanese Patent Application No. 2022-191465, filed Nov. 30, 2022, the content of which is incorporated herein by reference.

BACKGROUND OF THE INVENTION

Field of the Invention

The present disclosure relates to a detection system, a detection apparatus, a learning apparatus, a detection method, a learning method, and a program.

Description of Related Art

There are technologies for detecting images of minuscule detection targets in images (captured images) captured at prescribed magnifications. Additionally, image processing algorithms such as those for particle analysis are known. Technologies for image processing include, for example, those described Patent Document 1 (Japanese Patent No. 6629762) and Patent Document 2 (Japanese Unexamined Patent Application Publication (Translation of PCT Application) No. 2021-517255).

However, with the image processing algorithms used for particle analysis, etc., it is difficult to distinguish, for example, between particulate minuscule detection targets and noise in the captured images. For this reason, minuscule detection targets and large quantities of noise can both be extracted from captured images, thereby lowering the precision of particle analysis. Additionally, depending on the fluorescent dye, the experimental conditions or the detection target, the image quality of the captured images can become lower, thereby making it difficult to distinguish between the detection targets and noise in the captured images.

In image processing algorithms for classifying cell types and tissues, the classification is executed using observation equipment and magnifications of a level allowing an observer to classify the cell type, etc. Therefore, minuscule objects in captured images containing large amounts of noise are not expected to be detection targets. Additionally, since the shapes of minuscule detection targets in captured images are unclear, there are cases in which images of detection targets and noise images cannot be distinguished among captured images by simply focusing on characteristics of their shapes.

SUMMARY OF THE INVENTION

An example of an objective of the present disclosure is to provide a detection system, a detection apparatus, a learning apparatus, a detection method, a learning method and a program that can improve the performance for detecting images of minuscule detection targets in captured images.

An example of an aspect disclosed herein is a detection system provided with a learning apparatus and a detection apparatus, wherein the learning apparatus has a first preprocessing unit that extracts, from a captured image used for training, which includes a noise image and an image of an object having a detection target, a training image including an image of the detection target, based on a structure around the detection target, and a training unit that trains a machine learning model based on the training image; and the detection apparatus has an acquisition unit that acquires the machine learning model, a second preprocessing unit that extracts, from a captured image used for detection, which includes the noise image and the image of the object having the detection target, candidates for being the detection target image in which the detection target is captured, based on the structure around the detection target, and a detection unit that detects, in the captured image used for detection, the detection target image from among the detection target image candidates, by using the machine learning model.

DETAILED DESCRIPTION OF THE INVENTION

An embodiment disclosed herein will be explained in detail with reference to the drawings.

First Embodiment

Figure 1:
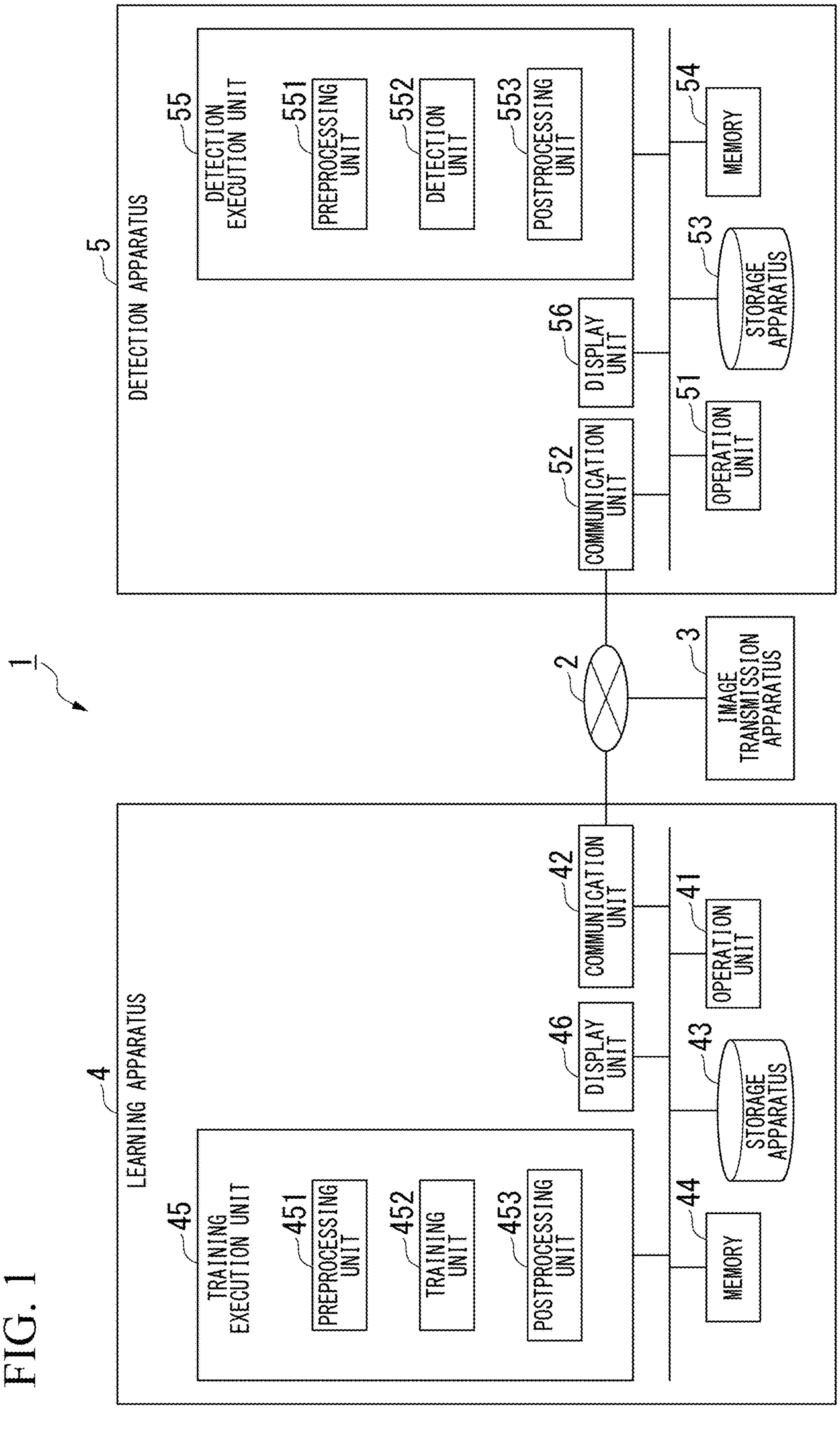
FIG. 1 is a diagram illustrating an example of the configuration of a detection system according to a first embodiment.

FIG. 1 is a diagram illustrating an example of the configuration of a detection system 1 according to a first embodiment. The detection system 1 is a system for detecting images of minuscule detection targets in captured images. In this case, the detection system 1 uses an image processing algorithm that focuses on the structures (shapes and colors) around the minuscule detection targets to extract detection target image candidates from the captured images. The detection system 1 uses a machine learning model to detect detection target images from among the detection target image candidates that have been extracted.

The captured images are, for example, images of biological samples captured at a prescribed magnification using an optical microscope. The captured images may be color images or may be monochromatic images (gray images).

The color images may be RGB (Red Green Blue) images, or may be images in another color space (for example, Lab color space).

The detection targets are, for example, organelles, cytoskeletons and proteins.

The organelles are, for example, lysosomes, autophagosomes, cell tissue, vesicles, mitochondria, etc. The cytoskeletons are growth cones, dendritic spines of neurons, actin filaments, microtubules, etc. The proteins (protein aggregates) are synapsin, synaptophysin, vesicular glutamate transporter (vGLUT), vesicular GABA transporter (vGAT), PSD-95 (postsynaptic density-95), drebrin, Homer, cell nuclei, micronuclei, stress granules, prions, β-amyloid, α-synuclein, etc., which have accumulated at the synapses of neurons.

The sizes of the minuscule detection targets are, for example, approximately from 0.01 to a few $\mu m^3$. The sizes of the minuscule detection targets are not limited to a specific size as long as they are minuscule (no larger than a predetermined threshold value) relative to the captured images.

The detection system 1 is provided with a communication line 2, an image transmission apparatus 3, a learning apparatus 4, and a detection apparatus 5. The communication line 2 may be a wired communication line or a wireless communication line. The leaning apparatus 4 and the detection apparatus 5 may be integrated or may be separate. That is, a single information processing apparatus may function as the learning apparatus 4 and may also function as the detection apparatus 5 in accordance with a computer program installed in the single information processing apparatus. Additionally, the respective functional units of the respective apparatuses in the detection system 1 may be distributed on a network such as the internet by making use of cloud technology.

The learning apparatus 4 is provided with an operation unit 41, a communication unit 42, a storage apparatus 43, a memory 44, a training execution unit 45, and a display unit 46. The training execution unit 45 is provided with a preprocessing unit 451, a training unit 452, and a postprocessing unit 453.

The learning apparatus 4 is realized as software by a processor such as a CPU (Central Processing Unit) executing a program stored in the memory 44 and the storage apparatus 43 having a non-volatile recording medium (non-transitory recording medium). The program may be recorded on a computer-readable recording medium. The computer-readable recording medium is, for example, a portable medium such as a flexible disk, a magneto-optic disk, a ROM (Read-Only Memory), or a CD-ROM (Compact Disc Read-Only Memory), or a non-transitory recording medium, for example, a storage apparatus such as a hard disk or a solid state drive (SSD) inside a computer system. The learning apparatus 4 may be realized by using hardware including an electronic circuit or circuitry using, for example, an LSI (Large-Scale Integrated circuit), an ASIC (Application-Specific Integrated Circuit), a PLD (Programmable Logic Device), or an FPGA (Field-Programmable Gate Array).

The detection apparatus 5 is provided with an operation unit 51, a communication unit 52, a storage apparatus 53, a memory 54, a detection execution unit 55, and a display unit 56. The detecting execution unit 55 is provided with a preprocessing unit 551, a detection unit 552, and a postprocessing unit 553.

The detection apparatus 5 is realized as software by a processor such as a CPU executing a program stored in the memory 54 and the storage apparatus 53 having a non-volatile recording medium (non-transitory recording medium). The program may be recorded on a computer-readable recording medium. The detection apparatus 5 may be realized by using hardware including an electronic circuit using, for example, an LSI, an ASIC, a PLD, an FPGA, etc.

The image transmission apparatus 3 is, for example, a server apparatus. The image transmission apparatus 3 pre-stores multiple captured images. The captured images include, for example, images of cells captured by an optical microscope. The image transmission apparatus 3 transmits captured images used for training to the communication unit 42 in response to requests from the communication unit 42. Additionally, the image transmission apparatus 3 transmits captured images used for detection to the communication unit 52 in response to requests from the communication unit 52.

During the training stage (training phase), the learning apparatus 4 trains a machine learning model based on the training images. The machine learning model includes, for example, neural networks such as convolutional neural networks (CNNs). The convolutional neural networks have convolutional layers and fully connected layers. The machine learning model may be of one type or of multiple types. Additionally, the machine learning model in the embodiment may be generated by performing fine-tune a machine learning model that has been trained in advance using teacher data.

The operation unit 41 is an operation device such as a mouse, a keyboard, and a touch panel. The operation unit 41 receives operations by a user. The operations by the user are, for example, operations for inputting, to the learning apparatus 4, instructions regarding whether or not to end the training. The operations by the user may, for example, be operations for inputting, to the learning apparatus 4, correct labels of teacher data used for machine learning. As a result thereof, since machine learning is executed so as to correspond to variations in the input teacher data, a machine learning model aligned with the senses of a user can be generated.

The communication unit 42 communicates with the image transmission apparatus 3. Additionally, the communication unit 42 communicates with the communication unit 52. The storage apparatus 43 pre-stores teacher data and a computer program for the training process using the machine learning model. The teacher data is a combination of training images (explanatory variables) and correct labels (objective variables). A computer program for machine learning, such as deep learning, is loaded into the memory 44 from the storage apparatus 43. The memory 44 may be provided with an auxiliary storage apparatus such as a graphics processing unit (GPU).

The training execution unit 45 trains the machine learning model by using training images and correct labels. The training execution unit 45 adjusts the parameters of the machine learning model by using, for example, error back-propagation with respect to outputs from the machine learning model (probability distributions (probability maps), probability scores). In this case, one type of detection target corresponds to each probability distribution. When multiple machine learning models are used, the probability distributions may be integrated (summed) for each detection target.

The preprocessing unit 451 executes prescribed preprocessing on captured images acquired from the image transmission apparatus 3. The preprocessing unit 451 extracts, from captured images, including noise images and images of objects (for example, cells) having detection targets (for example, drebrin), training images including images of detection targets, on the basis of image feature quantities (for example, brightness) based on the structures around the detection targets.

The preprocessing unit 451 identifies images of granular shapes (spherical shapes, protruding shapes) distributed in a captured image as detection target image candidates. The preprocessing unit 451 may extract training images including detection target images from the captured image by executing a Hough transform on the captured image. The preprocessing unit 451 may extract training images including detection target images from the captured image based on the curvature of protruding shapes (Shape Index values) in images distributed within the captured image. The preprocessing unit 451 may extract, from the captured image, training images including detection target images based on a Blob Filter utilizing a Hessian matrix, Histograms of Oriented Gradients utilizing first-order differences, or a Difference of Gaussian Filter utilizing a Gaussian function.

With such extraction algorithms using pixel values, false positives (FPs) may occur among the candidate determination results, in accordance with the sensitivity to pixel values. If there are few noise images in the captured images, then a segmentation network may be used on the captured image as long as increasing the work of assigning correct labels by the user to the training images is not minded.

When there are a lot of false positives among candidate determination results, the preprocessing unit 451 may extract training images including detection target images from the captured images based on the biochemical structures of detection targets in order to increase the specificity of the detection targets during candidate determination. For example, in the case in which the detection targets are minuscule structures located around synapses, the preprocessing unit 451 may use only images from around dendritic protrusions as detection target image candidates.

In the case in which the fluorescent dye color of cell bodies including dendritic protrusions is different from the fluorescent dye color of synapses, the preprocessing unit 451 may perform peak detection in the protruding cell bodies by executing a distance conversion process on the captured image. Additionally, the preprocessing unit 451 may identify coordinates near cell nuclei by fluorescent-dying the cell nuclei. The preprocessing unit 451 may apply round masks to regions including peak positions based on distance information from peak positions. In this way, the preprocessing unit 451 may use the round masks in the captured image to remove the cell body images including cell nucleus images from the captured image.

The preprocessing unit 451 prepares correct labels of teacher data for each detection target image candidate based on operations by a user. The preprocessing unit 451 may display an image in which detection target image candidates are emphasized on the display unit 46 at a single magnification or at multiple magnifications. As a result thereof, there is no need for the user to perform a complicated annotation method using a segmentation network. The user does not need to forcibly assign correct labels to candidates for which it is difficult for the user to determine whether or not the candidates are detection target images. The user may assign, to such detection target image candidates, correct labels indicating that they are not to be used in machine learning.

The training unit 452 trains the machine learning model based on the training images. The training unit 452 inputs the respective training images to the machine learning model. The inputs may be executed by a batch process. The training unit 452 adjusts the parameters of the machine learning model so as to reduce the error between the correct label and the output (class) from the machine learning model for each training image.

The postprocessing unit 453 executes prescribed postprocessing based on the training results from the training unit 452. The postprocessing unit 453 may, as the prescribed postprocessing, generate captured images, etc. in which the positions of the detection targets are emphasized by at least one of marking and coloring. The postprocessing unit 453 may generate images representing prescribed indices as the prescribed postprocessing.

The display unit 46 is a display device such as a liquid crystal display. The display unit 46 displays the images generated by the postprocessing unit 453.

During the inference stage (inference phase), the detection apparatus 5 uses the machine learning model to detect detection target images in captured images used for training. The operation unit 51 is an operation device such as a mouse, a keyboard, and a touch panel. The operation unit 51 receives operations by a user. The operations by the user are, for example, operations to input, to the detection apparatus 5, instructions regarding whether or not to end the inference.

The communication unit 52 communicates with the image transmission apparatus 3. Additionally, the communication unit 52 communicates with the communication unit 42. The storage apparatus 53 pre-stores a computer program for inference processing using a machine learning model. The storage apparatus 53 stores a machine learning model acquired from the learning apparatus 4. The storage apparatus 53 may store the coordinates of each detection target image candidate in a captured image. In the memory 54, a computer program for machine learning, such as deep learning, is loaded from the storage apparatus 53. The memory 54 may be provided with an auxiliary storage apparatus such as a graphics processing unit (GPU).

The detection execution unit 55 uses the machine learning model to detect detection target images in a captured image used for detection. The preprocessing unit 551 executes, on a captured image used for detection, acquired from the image transmission apparatus 3, preprocessing similar to the preprocessing executed by the preprocessing unit 451 in the training stage. The preprocessing unit 551 generates detection target image candidates in the captured image used for detection acquired from the image transmission apparatus 3 based on image feature quantities that are based on structures around the detection targets.

The detection unit 552 uses the machine learning model to execute a detection process on a captured image used for detection. The detection unit 552 inputs each detection target image candidate to a machine learning model. The inputs may be executed by a batch process. The detection unit 552 obtains outputs (probability distributions (probability maps), probability scores) from the machine learning model by inputting detection target image candidates to the machine learning model. As a result thereof, the detection unit 552 determines whether or not the detection target image candidates are detection target images based on the outputs from the machine learning model.

The detection execution unit 55 may derive, from the captured image, statistical quantities regarding the sizes of detection target image candidates and statistical quantities regarding information around the detection target image candidates. The detection execution unit 55 may determine whether or not a detection target image candidate is a detection target image by using a Support Vector Machine on a preprocessed captured image based on the statistical quantities. The detection execution unit 55 may determine whether or not detection target image candidates are detection target images based on the results of a clustering method (for example, K-Means) based on the statistical quantities.

The postprocessing unit 553 executes prescribed postprocessing based on the detection results from the detection unit 552. The postprocessing unit 553 may, as the prescribed postprocessing, generate captured images, etc. in which the positions of the detection targets are emphasized by at least one of marking and coloring. The postprocessing unit 553 may generate images representing prescribed indices as the prescribed postprocessing.

The display unit 56 is a display device such as a liquid crystal display. The display unit 56 displays the images generated by the postprocessing unit 553.

Next, preprocessing in the learning apparatus 4 will be explained.

Figure 2:
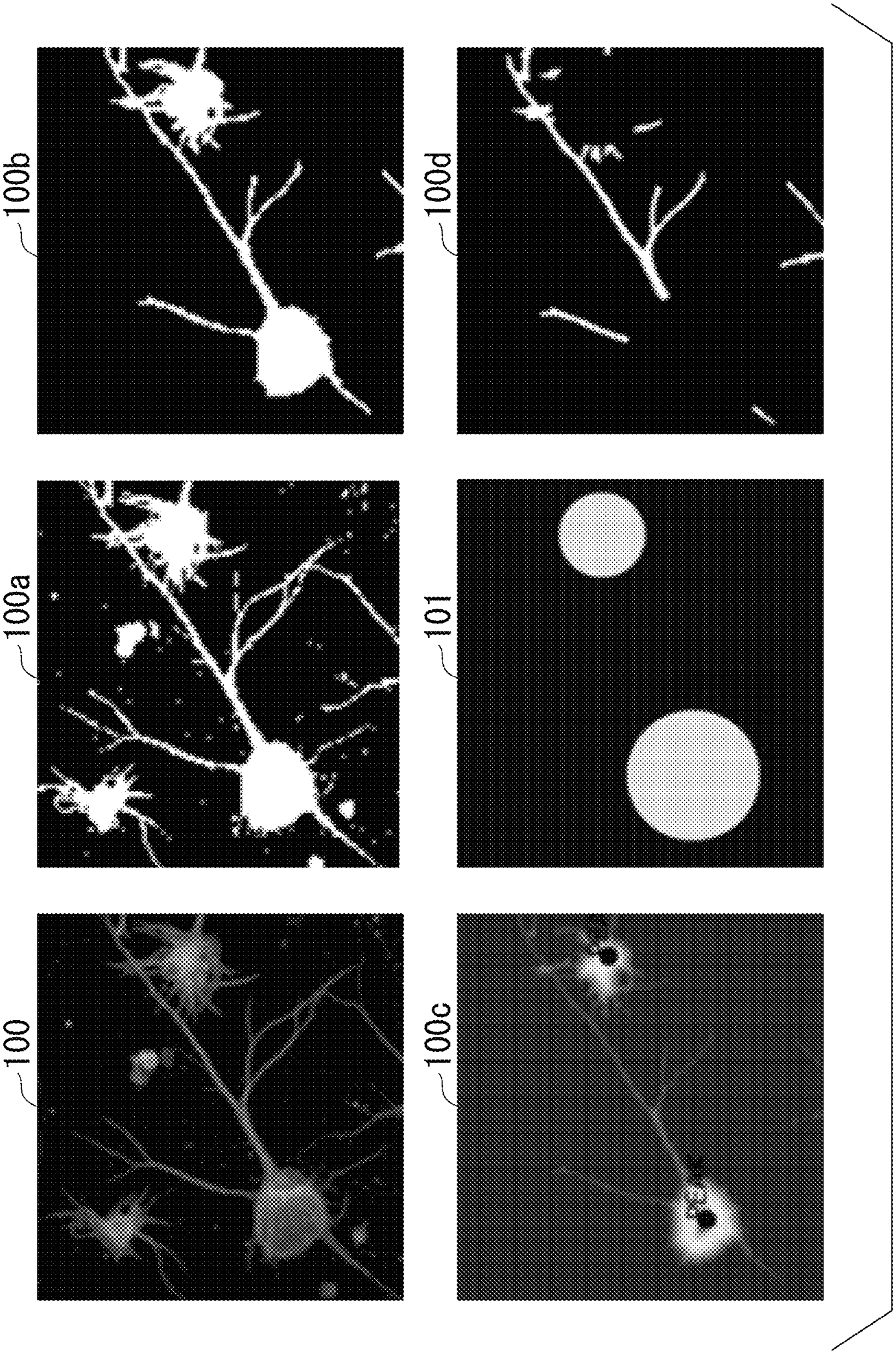
FIG. 2 is a diagram illustrating an example of preprocessing of a captured image according to the first embodiment.

FIG. 2 is a diagram illustrating an example of preprocessing of a captured image in the first embodiment. The captured image 100 is a captured image (original image) used for training. The captured image 100 includes images of multiple cells dyed by using one or more types of dyes or immunostaining methods. The shapes of the respective cell bodies are similar to granular shapes (spherical shapes, protruding shapes). The image capture magnification (angle of view) of the captured image 100 is arbitrary and is, for example, the image capture magnification in the optical microscope.

During the training stage, the preprocessing unit 451 executes a digitization process on the captured image 100 (gray image) acquired from the image transmission apparatus 3. As a result thereof, the preprocessing unit 451 generates the captured image 100*a*. The preprocessing unit 451 executes a noise removal process on the captured image 100*a*. As a result thereof, the preprocessing unit 451 generates a captured image 100*b*.

The preprocessing unit 451 executes a distance conversion process and a peak detection process on the captured image 100*b*. As a result thereof, the preprocessing unit 451 generates a captured image 100*c*. Since the shape of each cell is similar to a granular shape (spherical shape, protruding shape), the positions of peaks detected by a peak detection process will be positions near the center of each cell body image (near the cell nucleus) in the captured image 100*c*. The preprocessing unit 451 generates a mask image 101 based on the positions of detected peaks and the results of a distance conversion process. The mask image 101 includes round mask images centered near the centers of the respective cell body images. The sizes of round mask images are defined in accordance with the results of a distance conversion process.

The preprocessing unit 451 executes a masking process using the mask image 101 on the captured image 100*c*. As a result thereof, the preprocessing unit 451 generates a captured image 100*d*. In the captured image 100*d*, the images of the respective cell bodies are removed by the masking process, and axon images having synapse images and line-shaped images such as dendritic protrusion images remain. Drebrin, which is an example of a detection target, accumulates at the synapses in neurons. Therefore, for example, irregular images that do not occur near synapse images in a captured image 100 are likely to be noise images. Thus, drebrin images and noise images can be easily distinguished in a captured image 100 (original image) by the preprocessing unit 451 obtaining images (distributions) of synapses, which are structures around drebrin, in the captured image 100*d*.

Next, the training process and the postprocessing in the learning apparatus 4 will be explained.

Figures 3, 4:
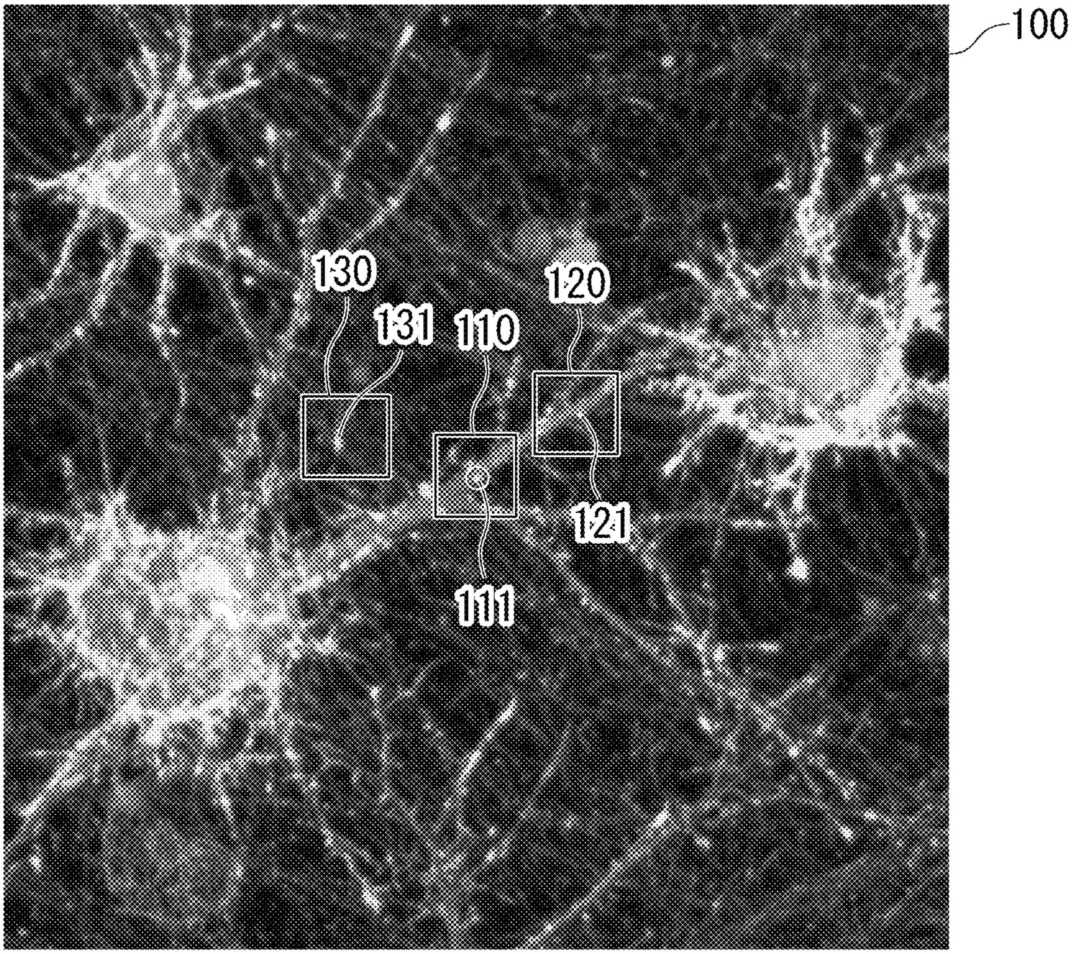
FIG. 3 is a diagram illustrating an example of a captured image used for training according to the first embodiment.
FIG. 4 is a diagram indicating an example of teacher data according to the first embodiment.

FIG. 3 is a diagram illustrating an example of a captured image 100 used for training in the first embodiment. Each training image in teacher data is a partial image (small region, small image) defined in the captured image 100 used for training. The shape of the training images is, for example, rectangular. Additionally, the size of the training images is arbitrary as long as it is less than the size of the captured image (much smaller than the captured image) and equal to or larger than the size of the detection target images. The training image 110 includes a detection target image 111 (drebrin image) at a synapse of a neuron. The training image 120 includes a detection target image 121 (drebrin image) at a synapse of a neuron. The training image 130 includes a noise image 131 at a position that is not a synapse of a neuron.

In the captured image 100 indicated in FIG. 3, reference numbers are only assigned to the training image 110, the training image 120, and the training image 130 as representative of training images for the purpose of ensuring that the drawings can be easily seen. Even more training images may be defined in the captured image 100.

The user operates the operation unit 41 while viewing the captured image 100 used for training, which is displayed on the display unit 46. The user defines a correct label for each training image by operating the operation unit 41. In this case, drebrin, which is an example of a detection target, accumulates at the synapses of neurons. Therefore, for example, a granular shape image, which is located near a dendritic protrusion image and an axon image having a synapse image, is likely to be drebrin images.

For example, since the training image 110 includes a synapse image, the user associates the correct label "drebrin class" (detection target class) with the training image 110. Additionally, since the training image 120 includes a synapse image, the user associates the correct label "drebrin class" with the training image 120.

For example, the training image 130 does not include a synapse image, and the noise image 131 is an irregular image (non-granular shape image). Additionally, the contrast component of the outline of the noise image 131 is not high. For these reasons, the user associates the correct label "noise class" or "background class" with the training image 120.

FIG. 4 is a diagram indicating an example of teacher data in a first embodiment. The teacher data includes a combination of a training image and the correct label "detection target class". The teacher data may include a combination of a training image and the correct label "noise class". In this case, the correct label may be defined to be in two classes, i.e., the detection target class and the noise class (background class), or may be defined to be in the noise class and in a class for each size of the granular shape (protrusion).

Next, the preprocessing, the detection process (inference process), and the postprocessing in the detection apparatus 5 will be explained.

Figure 5:
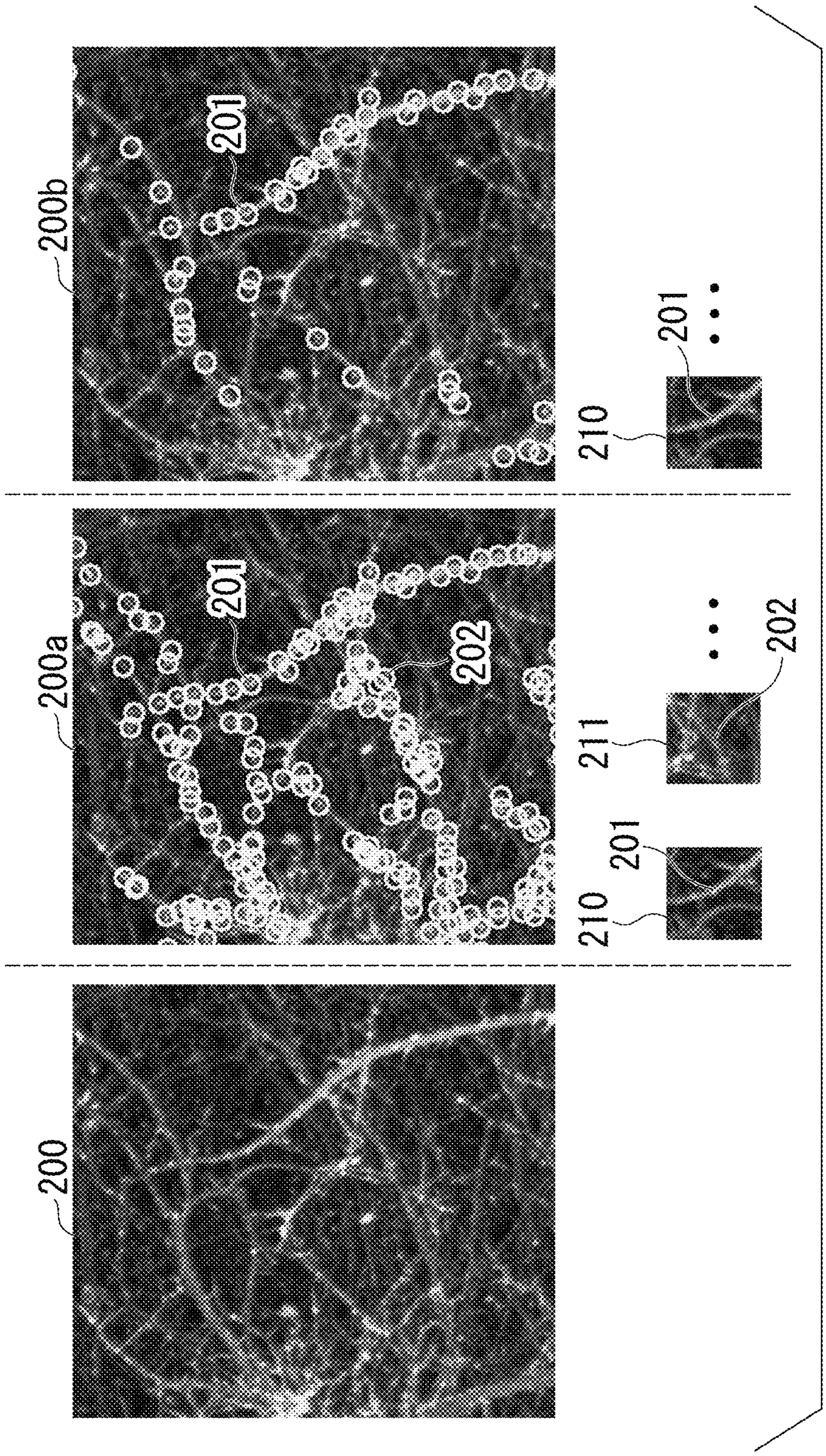
FIG. 5 is a diagram illustrating an example of preprocessing and detection processing on a captured image used for detection according to the first embodiment

FIG. 5 is a diagram illustrating an example of preprocessing and a detection process performed on a captured image used for detection in the first embodiment. The captured image 200 is a captured image (original image) used for detection. In the inference stage, the preprocessing unit 551 executes, on the captured image 200 acquired from the image transmission apparatus 3, preprocessing similar to the preprocessing executed by the preprocessing unit 451 in the training stage. As a result, the preprocessing unit 551 generates detection target image (drebrin image) candidates in the captured image 200*a*. The preprocessing unit 551 associates coordinates in the captured image 200*a* with the detection target image candidates in the captured image 200*a*.

In the captured image 200*a* illustrated in FIG. 5, multiple circles are drawn, for convenience, with the purpose of indicating the positions of detection target image (drebrin image) candidates in synapses of neurons. The position of each circle indicates the position of each detection target image candidate. In the captured image 200*a*, reference numbers are assigned to only detection target images 201 and noise images 202, as representative of detection target image candidates, for the purpose of ensuring that the drawings can be easily seen.

The detection target image candidate 210 is one detection target image candidate that is input to the machine learning model in the inference stage. The detection target image candidate 210 includes a detection target image 201 (granular shape image). The detection target image candidate 211 is another detection target image candidate input to the machine learning model in the inference stage. The detection target image candidate 211 includes a noise image 202 (irregular image). Thus, after the preprocessing unit 551 has executed the preprocessing, the detection target image candidates may include noise images 202 in a stage in which the detection process using the machine learning model has not been executed by the detection unit 552 (in a stage before the detection process is executed in the inference stage).

During the inference stage, the detection unit 552 uses the machine learning model to execute a detection process (inference process) on the captured image 200*a*. In this case, the detection unit 552 inputs each detection target image candidate to the machine learning model. In FIG. 5, by inputting the candidate 210 to the machine learning model, the detection unit 552 obtains the output "drebrin class" from the machine learning model (trained model). As a result thereof, the detection unit 552 determines that the detection target image 201 of the candidate 210 is a detection target image (drebin image). Additionally, by inputting the candidate 211 to the machine learning model, the detection unit 552 obtains the output "noise class" from the machine learning model (trained model). As a result thereof, the detection unit 552 determines that the noise image 202 of the candidate 211 is not a detection target image. That is, the detection unit 552 determines that the noise image 202 of the candidate 211 is a noise image.

The postprocessing unit 553 executes prescribed postprocessing on each of the candidates determined to be detection target images. For example, the postprocessing unit 553 generates the captured image 200*b* by drawing circles at the respective positions of detection target images in the captured image 200. The postprocessing unit 553 may, as one index, count the number of detection target images in the captured image 200*b*. The postprocessing unit 553 may, as one index, derive the maturity of a cell based on the number of detection target images (drebrin images) in the captured image 200.

Next, an operating example of the detection system 1 will be explained.

Figure 6:
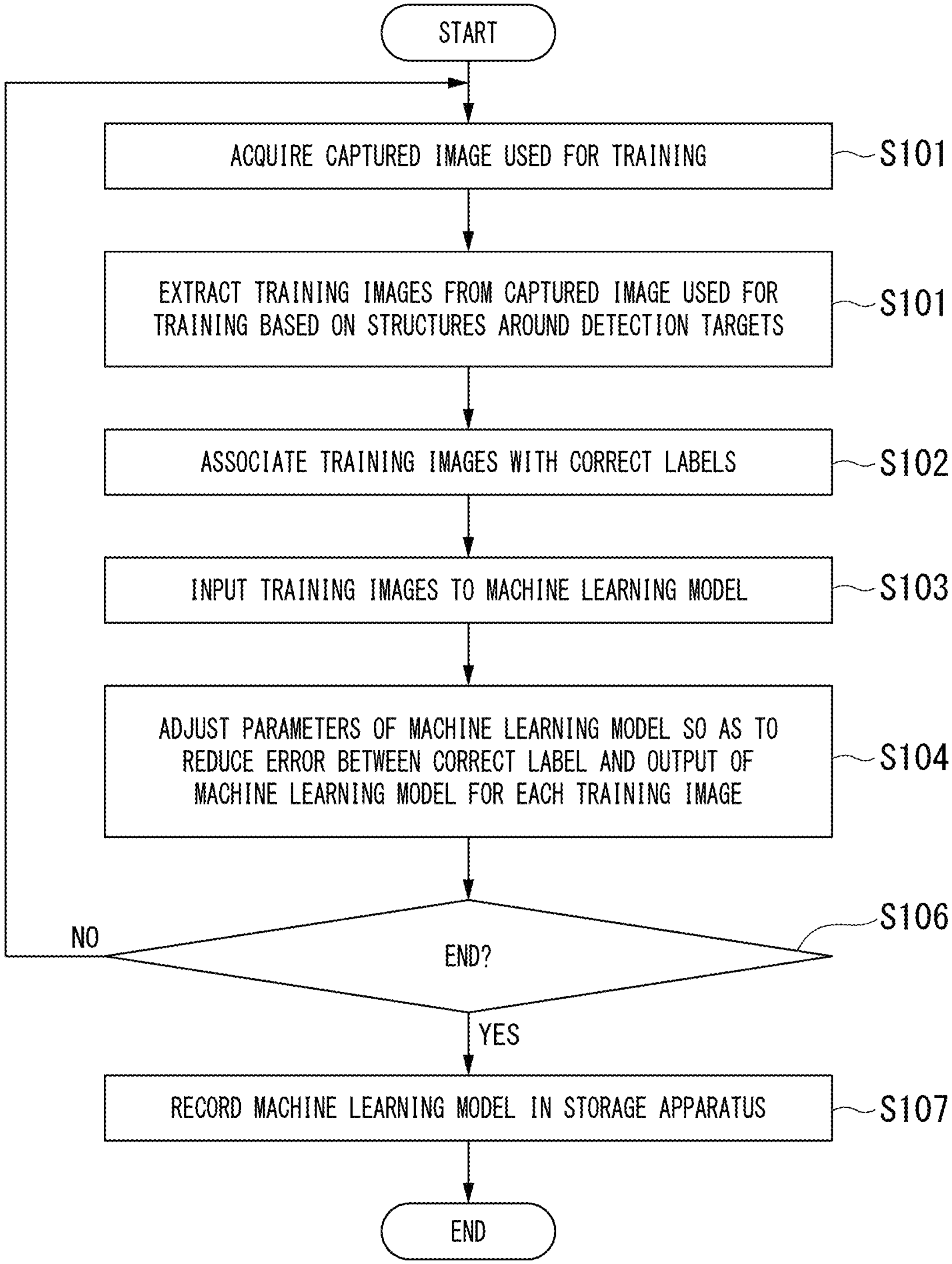
FIG. 6 is a flow chart indicating an example of operations in a detection system training stage according to the first embodiment.

FIG. 6 is a flow chart indicating an operating example for the training stage of the detection system 1 in a first embodiment. The preprocessing unit 451 acquires a captured image 100 used for training from the image transmission apparatus 3 (step S101). The preprocessing unit 451 extracts a training image 110, a training image 120, etc. from the captured image 100 used for training based on being located within a prescribed distance from a structure (synapse) around the detection target (drebrin). The preprocessing unit 451 may extract the training image 130, etc. from the captured image 100 used for training based on being located a prescribed distance or farther from the structure around the detection target (step S102).

The preprocessing unit 451 associates a training image and a correct label based on an operation received by the operation unit 41. For example, the preprocessing unit 451 associates a correct label "drebrin class" with the training image 110 including a synapse image and the detection target image 111 (drebrin image). For example, the preprocessing unit 451 associates a correct label "noise class" with the training image 130 not including a synapse image (step S103).

The training unit 452 inputs each training image to the machine learning model (step S104). The training unit 452 adjusts the parameters of the machine learning model so as to reduce the error between the correct label and the output (class) from the machine learning model for each training image (step S105). The training unit 452 determines whether or not to end the training process based, for example, on an operation received by the operation unit 41 (step S106). In the case in which the training process is to be continued (step S106: NO), the training unit 452 returns the process to step S101. In the case in which the training process is to be ended (step S106: YES), the training unit 452 records the machine learning model (trained model) in the storage apparatus 43 (step S107).

Figure 7:
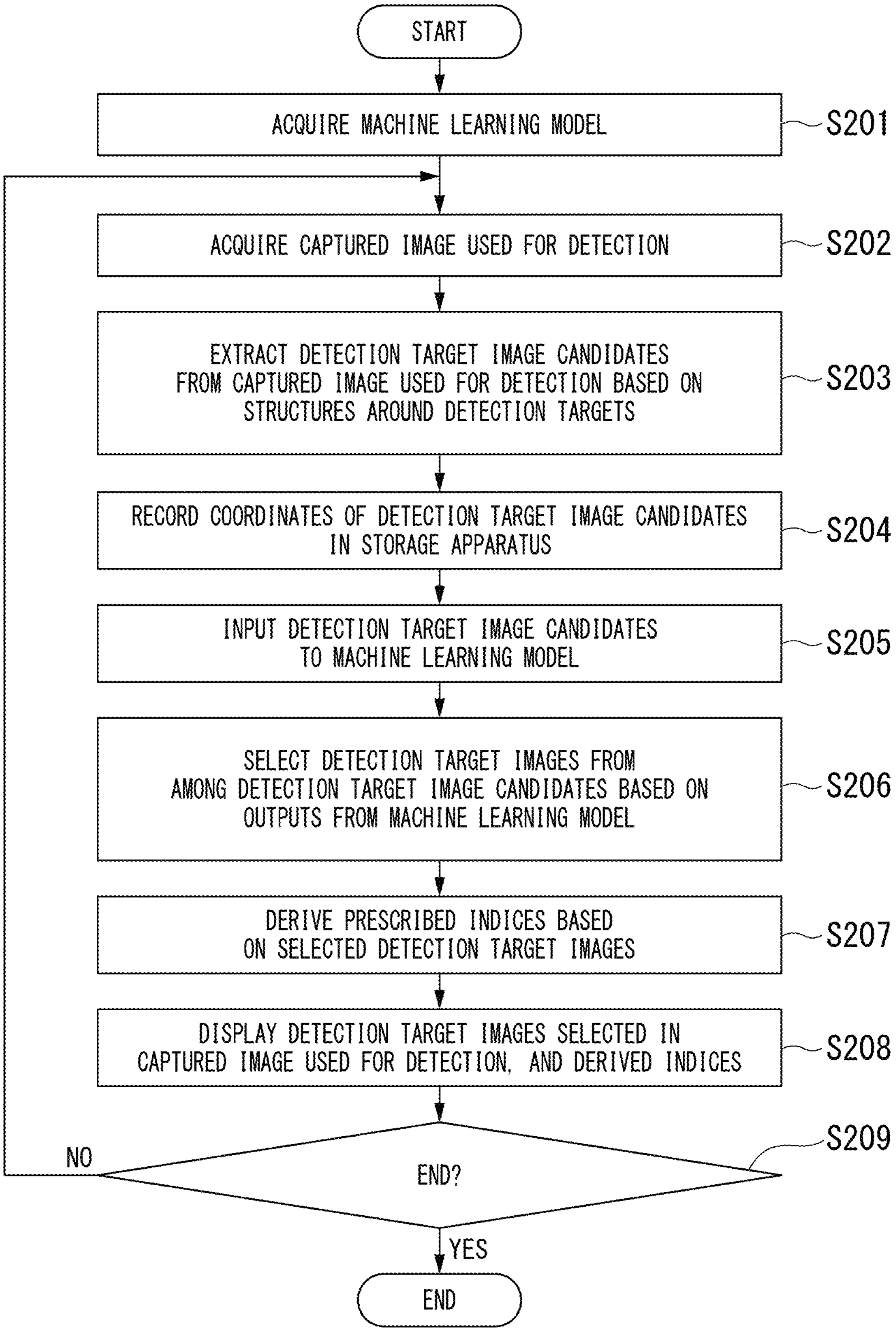
FIG. 7 is a flow chart indicating an example of operations in a detection system inference stage according to the first embodiment.

FIG. 7 is a flow chart illustrating an operating example of an inference stage of the detection system 1 in the first embodiment. The detection unit 552 acquires the machine learning model (trained model) from the learning apparatus 4 (step S201). The preprocessing unit 551 acquires a captured image 200 used for detection from the image transmission apparatus 3 (step S202). The preprocessing unit 551 extracts detection target image candidates 210, etc. from the captured image 200 used for detection based on the structures around the detection targets (synapsin) (step S203). The preprocessing unit 551 records the coordinates of each detection target image candidate in the storage apparatus 53 (step S204).

The detection unit 552 inputs each detection target image candidate to the machine learning model (step S205). The detection unit 552 selects, as each detection target image from among the detection target image candidates 210, etc., candidates 210, etc. including the detection target images 201 (step S206), based on the output "drebrin class" from the machine learning model.

The postprocessing unit 553 derives a prescribed index (for example, cell maturity) based on the selected detection target images 201, etc. For example, the postprocessing unit 553 counts the number of proteins (drebrin) based on the number of detection target images. The postprocessing unit 553 uses information on dendritic protrusions to derive the unit lengths of the dendritic protrusions and the density in a unit area. The postprocessing unit 553 derives the cell maturity based on the density per unit area (step S207). The postprocessing unit 553 displays, on the display unit 56, the captured image 200 used for detection, the detection target images 201, etc. selected in the captured image 200 used for detection, and derived indices (step S208).

The detection unit 552 determines whether or not to end the detection process based, for example, on an operation received by the operation unit 41. In the case in which the training process is to be continued (step S209: NO), the detection unit 552 returns the process to step S202. In the case in which the detection process is to be ended (step S209: YES), the detection unit 552 ends the detection process.

As described above, the detection system 1 is provided with a learning apparatus 4 and a detection apparatus 5. The learning apparatus 4 has a preprocessing unit 451 (first preprocessing unit) and a training unit 452. The preprocessing unit 451 extracts, based on structures around detection targets, training images including detection target images from a captured image including noise images and images of objects (for examples, cells) having detection targets (for example, drebrin). Even if the detection targets themselves are minuscule, the structures around the detection targets are not minuscule. The training unit 452 trains a machine learning model based on the training images.

The detection apparatus 5 has a preprocessing unit 551 (second preprocessing unit) and a detection unit 552 (acquisition unit). The detection unit 552 uses the communication unit 52 to acquire a machine learning model from the image transmission apparatus 3. The preprocessing unit 551 extracts, from a captured image 200 used for detection, which includes noise images and images of objects having detection targets, candidates for being detection target images in which the detection targets are captured, based on structures (for example, the distribution of synapses) around the detection target. The detection unit 552 uses the machine learning model to detect, in the captured image 200*a*, for example, a detection target image 201 of a candidate 210 from among detection target image candidate 210, candidate 211, etc.

Due to these features, the performance for detecting images of minuscule detection targets in a captured image can be improved.

Second Embodiment

In the second embodiment, the main difference from the first embodiment is that detection results from the inference stage are fed back to the machine learning in the training stage. The explanation of the second embodiment will be centered on the differences from the first embodiment.

The training unit 452 uses, for the machine learning model training process, a combination of a detection target image and an output from the machine learning model fed back from the detection apparatus 5 as at least one of a combination of training images and correct labels in the training stage.

Figure 8:
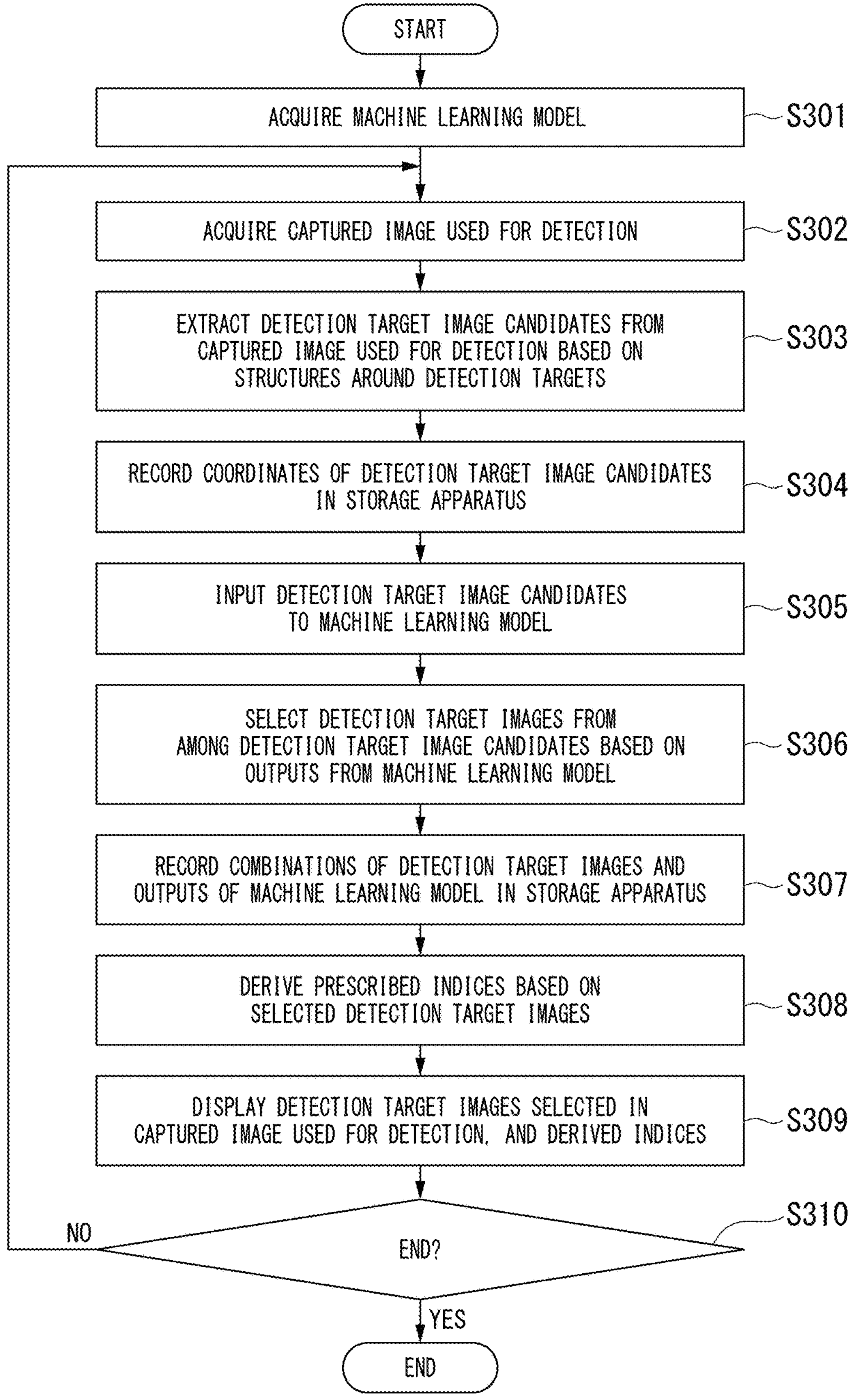
FIG. 8 is a flow chart indicating an example of operations in a detection system inference stage according to a second embodiment.

FIG. 8 is a flow chart indicating an operating example for the inference stage in the detection system 1 according to the second embodiment. The respective operations from step S301 to step S306 indicated in FIG. 8 are the same as the respective operations from step S201 to step S206 indicated in FIG. 7. The detection unit 552 records, in the storage apparatus 43 or the storage apparatus 53, combinations of detection target images with outputs (correct labels) from the machine learning model (step S307). The respective operations from step S308 to step S310 indicated in FIG. 8 are the same as the respective operations from step S207 to step S209 indicated in FIG. 7.

Figure 9:
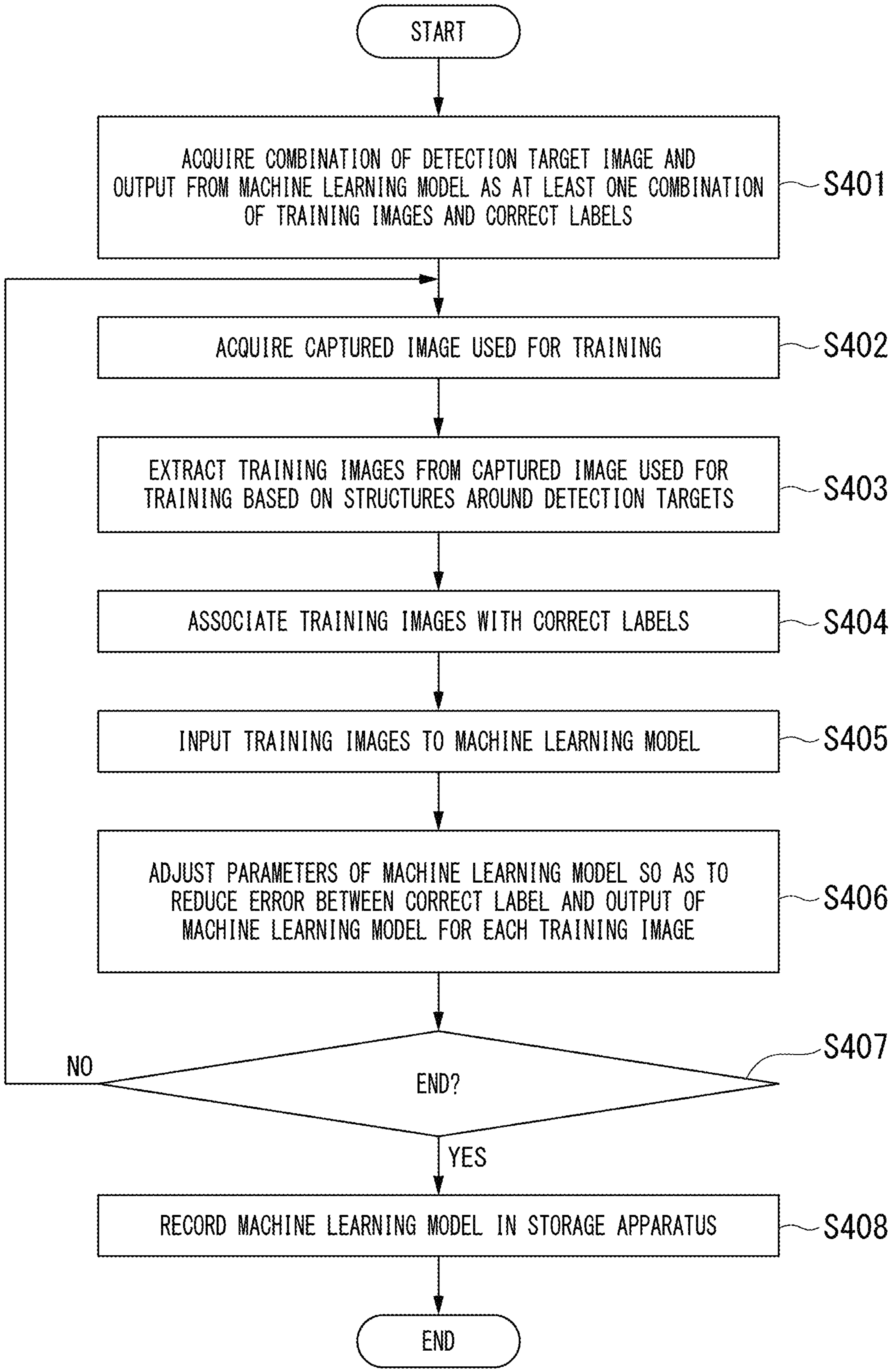
FIG. 9 is a flow chart indicating an example of operations in a detection system training stage according to the second embodiment.

FIG. 9 is a flow chart indicating an operating example for the training stage in the detection system 1 in the second embodiment. The training unit 452 acquires, from the storage apparatus 43 or the storage apparatus 53, a combination of a detection target image and an output from the machine learning model in the inference stage as at least one of a combination of training images and correct labels in the training stage (step S401). The respective operations from step S402 to step S408 indicated in FIG. 9 are the same as the respective operations from step S101 to step S207 indicated in FIG. 6.

As described above, the training unit 452 uses, for the machine learning model training process, a combination of a detection target image and an output from the machine learning model during the inference stage as at least one of a combination of training images and correct labels during the training stage.

As a result thereof, the performance for detecting images of minuscule detection targets in a captured image can be further improved.

The present disclosure includes the embodiments below.

[1] A detection system provided with a learning apparatus and a detection apparatus, wherein the learning apparatus has a first preprocessing unit that extracts, from a captured image used for training, which includes a noise image and an image of an object having a detection target, a training image including an image of the detection target, based on a structure around the detection target, and a training unit that trains a machine learning model based on the training image; and the detection apparatus has an acquisition unit that acquires the machine learning model, a second preprocessing unit that extracts, from a captured image used for detection, which includes the noise image and the image of the object having the detection target, candidates for being the detection target image in which the detection target is captured, based on the structure around the detection target, and a detection unit that detects, in the captured image used for detection, the detection target image from among the detection target image candidates, by using the machine learning model.

[2] The detection system according to [1], further provided with a postprocessing unit that displays, on a display unit, the captured image used for training or the captured image used for detection, in which the position of the detection target is emphasized by at least one of marking and coloring.

[3] The detection system according to [1] or [2], wherein the first preprocessing unit extracts the training image from the captured image used for training based on a line-shaped image in accordance with the structure around the detection target.

[4] The detection system according to any one of [1] to [3], wherein the second preprocessing unit extracts the training image from the captured image used for detection based on a line-shaped image in accordance with the structure around the detection target.

[5] A detection apparatus provided with an acquisition unit that acquires a machine learning model that has been trained by using a training image extracted from a captured image used for training based on a structure around a detection target; a preprocessing unit that extracts, from a captured image used for detection, which includes a noise image and an image of an object having the detection target, candidates for being the detection target image in which the detection target is captured, based on the structure around the detection target; and a detection unit that detects, in the captured image used for detection, the detection target image from among the candidates for being the detection target image, by using the machine learning model.

[6] A learning apparatus provided with a preprocessing unit that extracts, from a captured image used for training, which includes a noise image and an image of an object having a detection target, a training image including an image of the detection target, based on a structure around the detection target; and a training unit that trains a machine learning model based on the training image.

[7] A detection method executed by a detection apparatus, wherein the detection method includes acquiring a machine learning model that has been trained by using a training image extracted from a captured image used for training based on a structure around a detection target; extracting, from a captured image used for detection, which includes a noise image and an image of an object having the detection target, candidates for being a detection target image in which the detection target is captured, based on the structure around the detection target; and detecting, in the captured image used for detection, the detection target image from among the candidates for being the detection target image, by using the machine learning model.

[8] A detection method executed by a learning apparatus, wherein the learning method includes extracting, from a captured image used for training, which includes a noise image and an image of an object having a detection target, a training image including an image of the detection target, based on a structure around the detection target; and training a machine learning model based on the training image.

[9] A program for making a computer execute processes, the processes includes acquiring a machine learning model that has been trained by using a training image extracted from a captured image used for training based on a structure around a detection target; extracting, from a captured image used for detection, which includes a noise image and an image of an object having the detection target, candidates for being a detection target image in which the detection target is captured, based on the structure around the detection target; and detecting, in the captured image used for detection, the detection target image from among the candidates for being the detection target image, by using the machine learning model.

[10] A program for making a computer execute processes, the processes includes extracting, from a captured image used for training, which includes a noise image and an image of an object having a detection target, a training image including an image of the detection target, based on a structure around the detection target; and training a machine learning model based on the training image.

While embodiments disclosed herein have been explained in detail by referring to the drawings above, the specific configurations are not limited to these embodiments, and designs, etc. within a range not departing from the spirit of this disclosure are included.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A detection system, comprising:

a learning apparatus including first processing circuitry configured to:

extract, from a first captured image of neurons used for training, which includes a noise image and an image of an object having a detection target, a training image including an image of the detection target, based on a structure around the detection target; and train a machine learning model based on dendritic protrusions in the training image; and a detection apparatus including second processing circuitry configured to:

receive a second captured image which includes (i) a neuron, (ii) fluorescent dyed dendritic spines of the neuron or protein accumulated at a synapse of the neuron, and (iii) an image element resulting from noise;

execute a distance conversion process and a peak detection process on the second captured image to identify positions of cell bodies in the second captured image;

generate a mask image based on the identified positions;

execute a masking process using the mask image to remove cell body images from the second captured image, to generate a processed image in which dendritic protrusion images remain;

acquire the machine learning model;

extract, from the processed image, candidate fluorescent dyed dendritic spines of the neuron or protein accumulated at a synapse of the neuron based on a location of dendritic protrusions in the processed image; and detect, in the second captured image, the fluorescent dyed dendritic spines of the neuron or the protein accumulated at the synapse of the neuron by using the machine learning model.

2. The detection system according to claim 1, further comprising a display that displays, the first captured image or the second captured image such that a position of the detection target is emphasized by at least one of marking and coloring.

3. The detection system according to claim 1, wherein the first processing circuitry extracts the training image from the first captured image based on a line-shaped image in accordance with the structure around the detection target.

4. A detection apparatus, comprising:

processing circuitry configured to:

receive a captured image which includes (i) a neuron, (ii) fluorescent dyed dendritic spines of the neuron or protein accumulated at a synapse of the neuron, and (iii) an image element resulting from noise;

execute a distance conversion process and a peak detection process on the captured image to identify positions of cell bodies in the captured image;

generate a mask image based on the identified positions;

execute a masking process using the mask image to remove cell body images from the captured image, to generate a processed image in which dendritic protrusion images remain;

extract, from the processed image, candidate fluorescent dyed dendritic spines of the neuron or protein accumulated at a synapse of the neuron based on a location of dendritic protrusions in the processed image; and detect, in the captured image, the fluorescent dyed dendritic spines of the neuron or the protein accumulated at the synapse of the neuron by using a machine learning model, wherein the machine learning model has been trained using training images extracted from a further captured image of neurons, based on dendritic protrusions in the training images.

* * * * *